Figure 15:
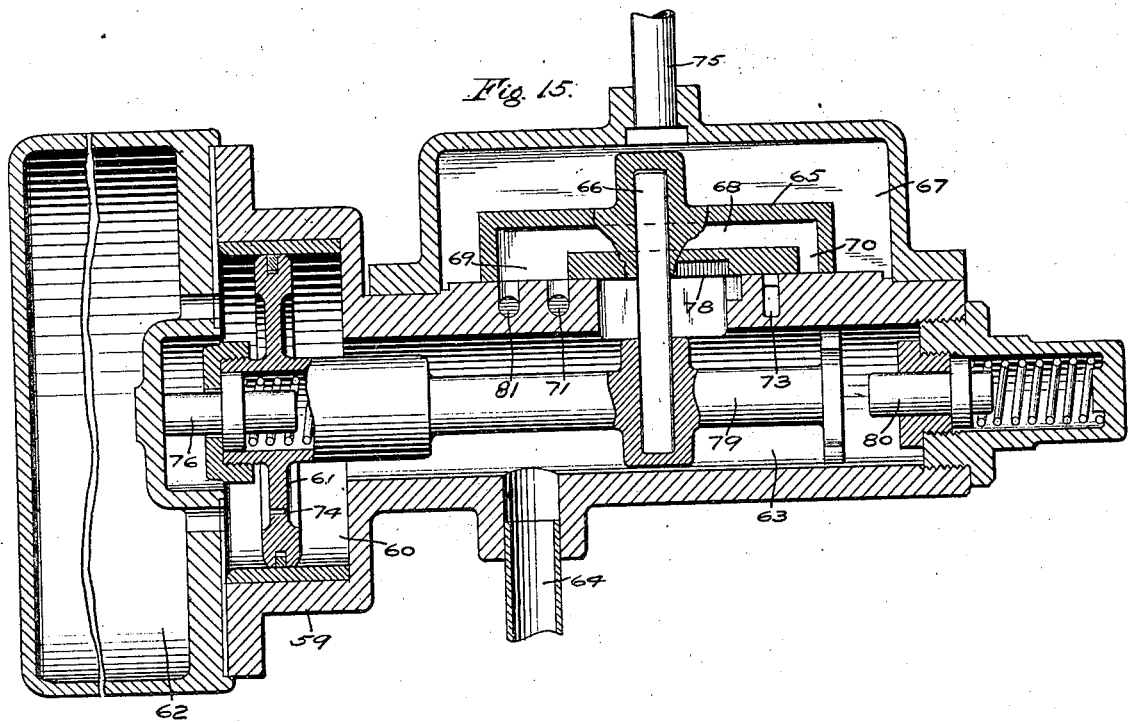

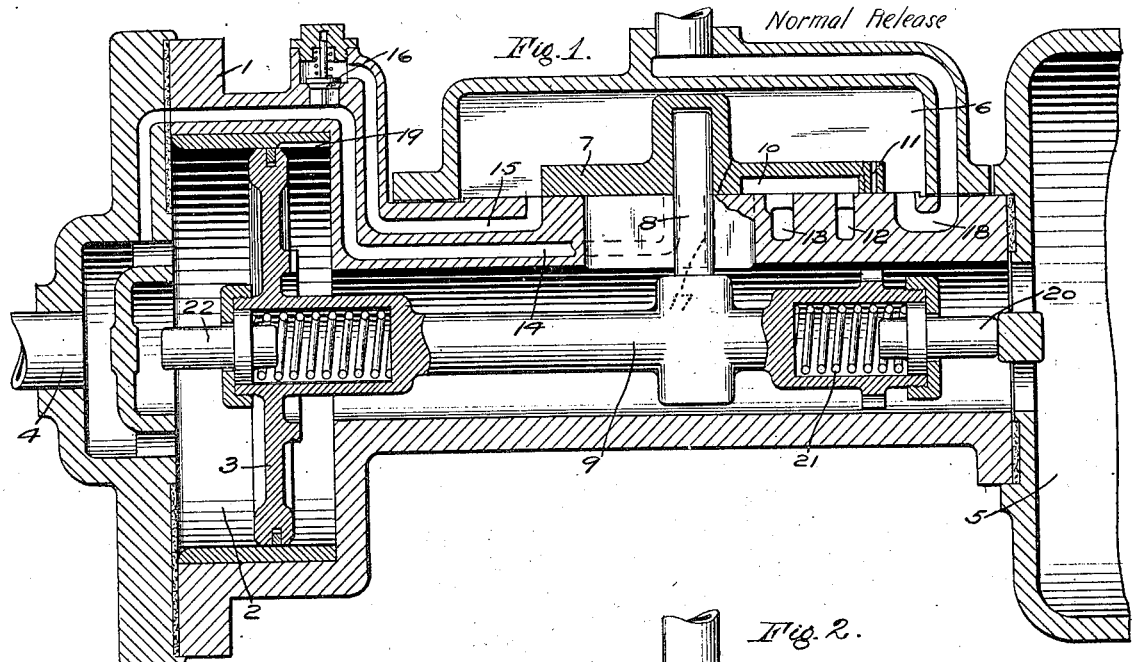
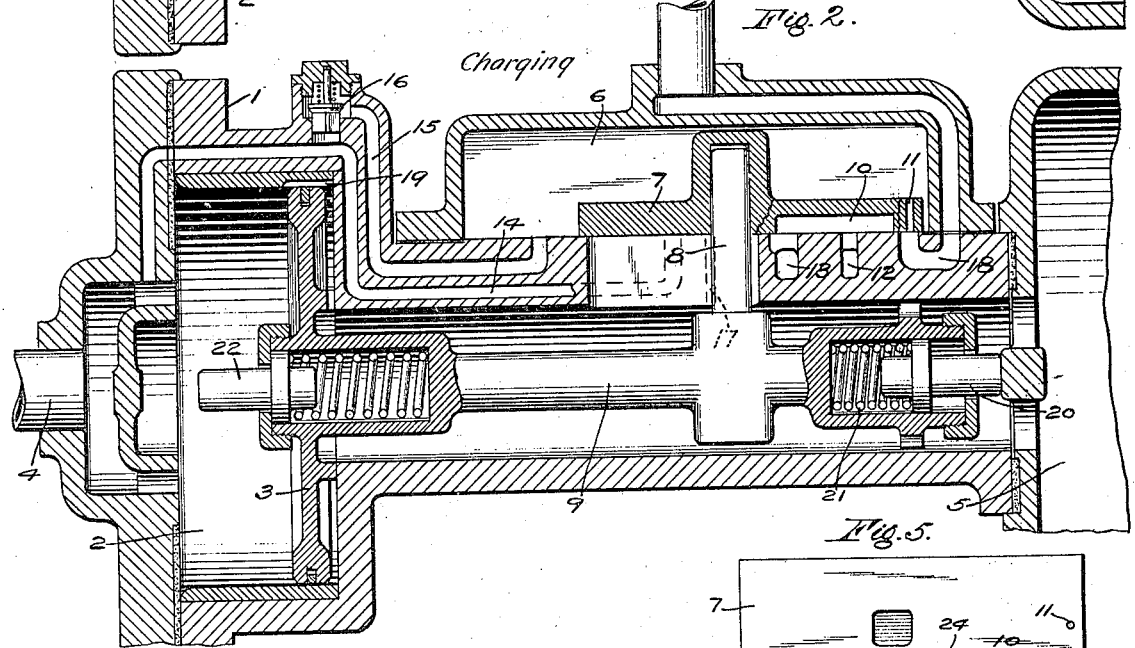
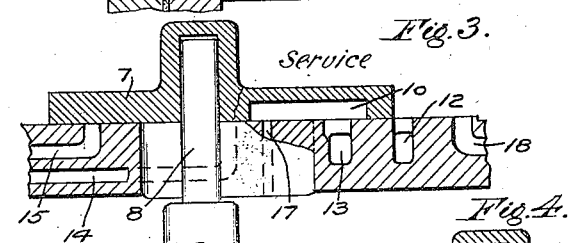
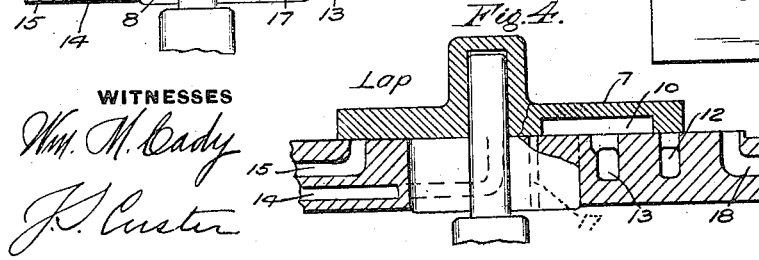
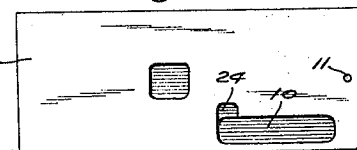
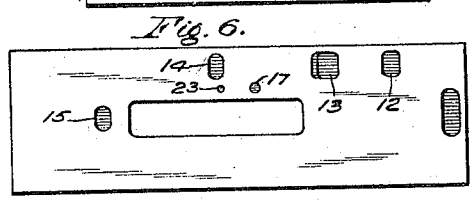

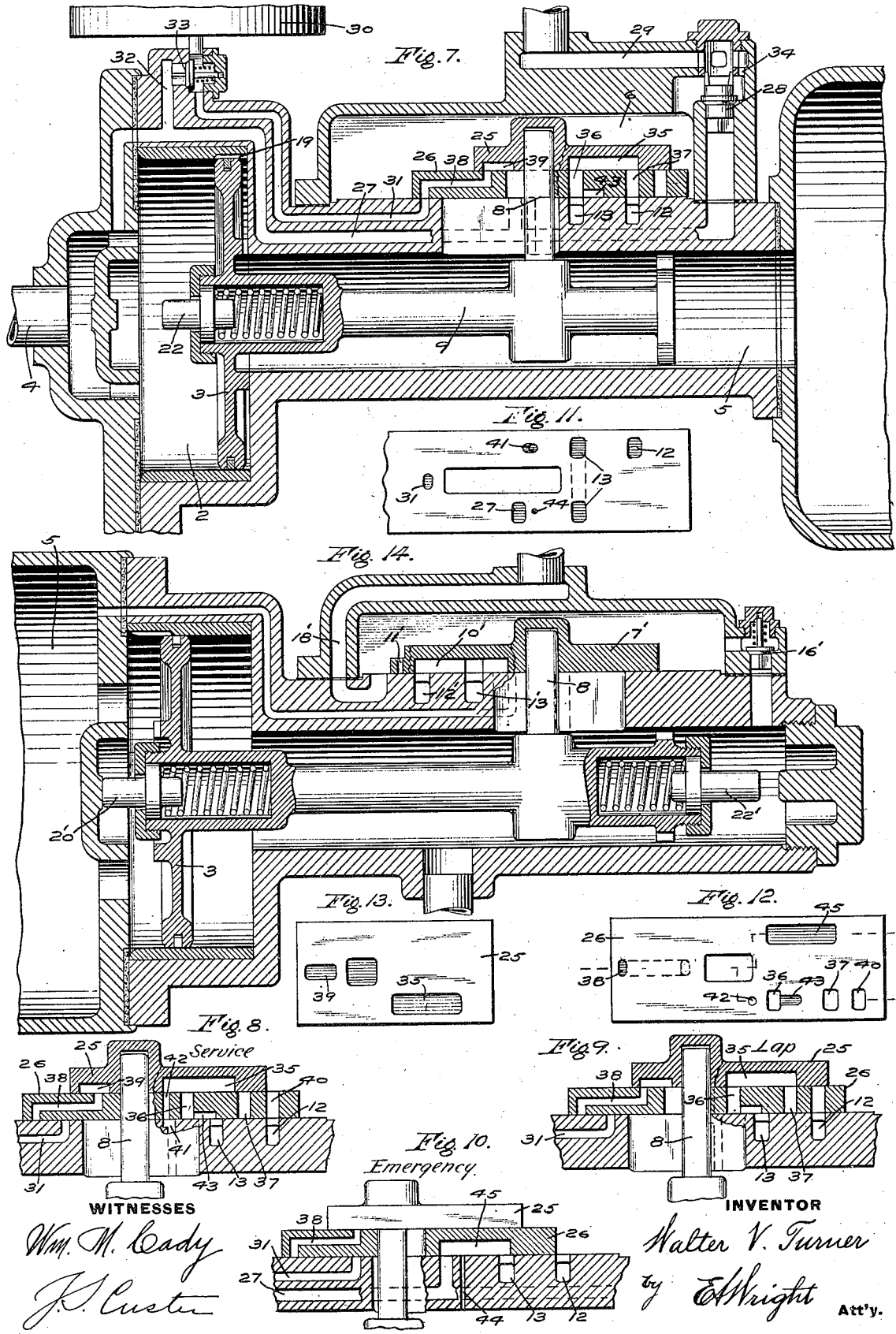

W. V. TURNER.
FLUID PRESSURE BRAKE.
APPLICATION FILED MAY 20, 1909.

1,130,450.

Patented Mar. 2, 1915.
4 SHEETS—SHEET 3.

WITNESSES
Wm. M. Cady
J. Custer

INVENTOR
Walter V. Turner
by E. Wright
Att'y.

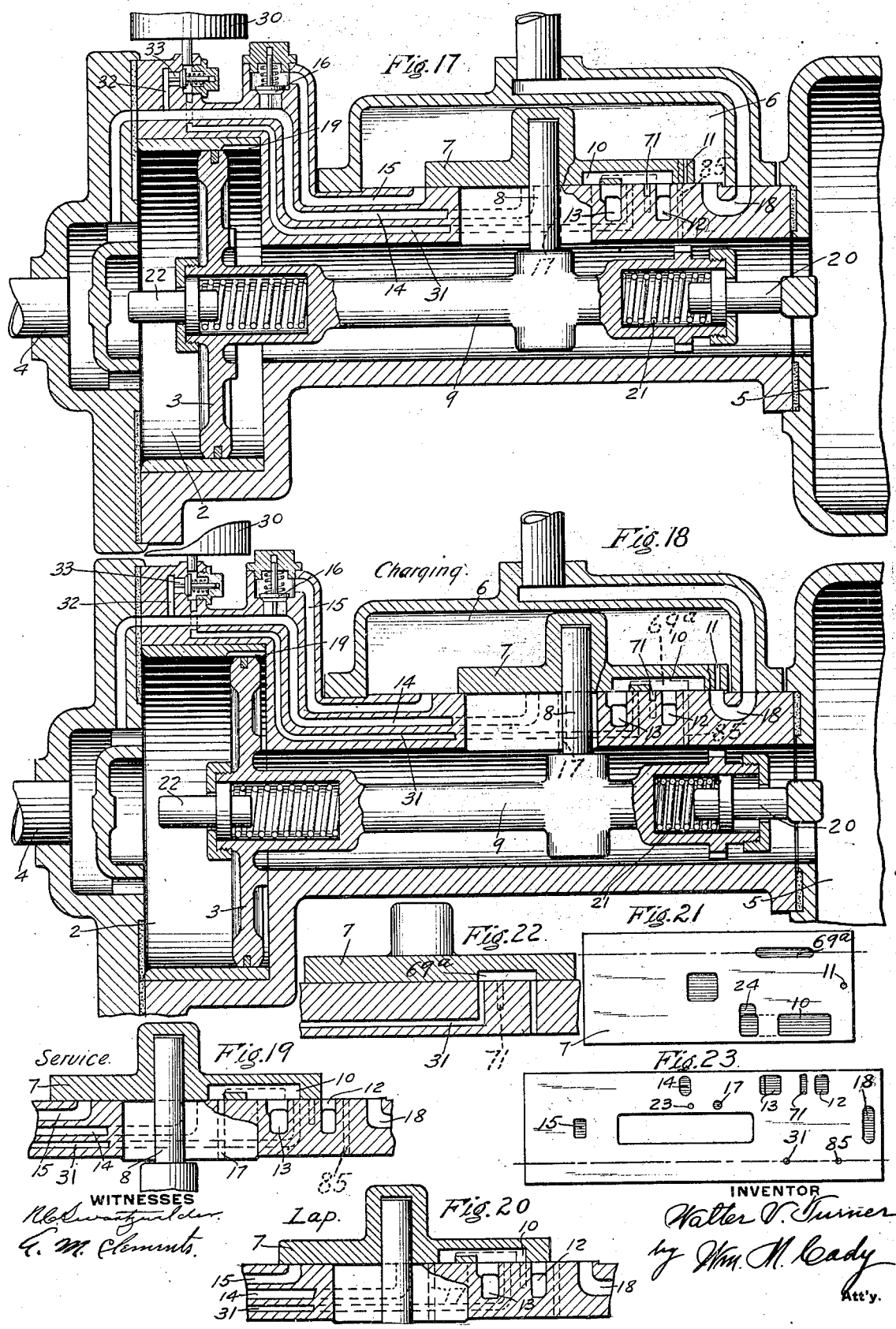

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,130,450.

Specification of Letters Patent. Patented Mar. 2, 1915.

Application filed May 20, 1909. Serial No. 497,166.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

My invention relates to fluid pressure brakes, and primarily to an automatic valve device in the nature of a triple valve, operating in response to reductions in train pipe pressure to admit fluid under pressure to the brake cylinder; according to one phase of my improvements, in connection with an automatic air brake system and according to another phase in connection with an automatic brake system combined with an electro-pneumatic, straight air, or other form of independent brake controlling means.

As is well known, the usual standard automatic air brake equipment includes a triple valve device provided with valve means and a piston subject to the opposing pressures of the train pipe and auxiliary reservoir and operating upon a reduction in train pipe pressure to admit air from the auxiliary reservoir to the brake cylinder. It has also been proposed to provide an automatic valve device of the above character in which the operating piston is subject on one side to a substantially constant pressure and on the opposite side to train pipe pressure and brake cylinder pressure for governing the admission of air to the brake cylinder.

One object of my present invention is to provide an automatic valve device adapted to operate in response to a reduction in train pipe pressure for supplying air from a source of fluid pressure to the brake cylinder, and which is governed by pressures independent of the brake cylinder pressure and the pressure of the source of supply for the brake cylinder.

Another object of my invention is to provide an improved automatic valve device adapted to be employed in connection with a combined automatic air and an independent brake controlling means such as an electro-pneumatic or straight air brake.

By means of my improved automatic valve device, the usual auxiliary reservoir may be dispensed with upon cars equipped with a local source of fluid pressure, such as an air compressor and a main storage reservoir from which air may be supplied to the brake cylinder. The invention also permits of maintaining the brake cylinder supply at a pressure higher than the train pipe pressure, as the source of supply may be entirely cut off from the train pipe, and furthermore the need for pump synchronizing apparatus is obviated, for the reason that each air compressor is governed solely by the pressure in the corresponding main reservoir and is therefore independent of other air compressors which may be located in the train.

Figure 16:
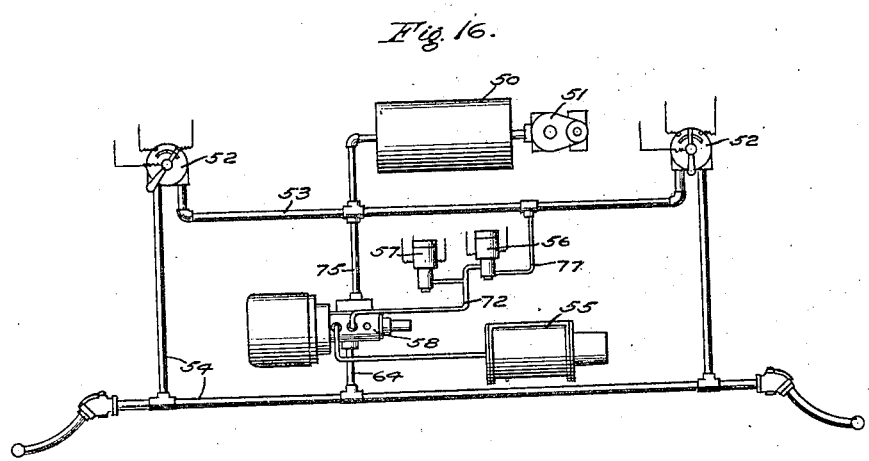

In the accompanying drawings, Figure 1 is a central sectional view of an automatic valve device embodying my improvement, showing the parts in normal release position; Fig. 2 a similar view of the above valve device, showing the parts in charging position; Fig. 3 a fragmentary sectional view of the main valve and seat of the above valve device, showing the valve in service application position; Fig. 4 a view similar to that shown in Fig. 3 with the valve in service lap position; Fig. 5 a face view of the main slide valve, showing the relative location of the ports and cavities therein; Fig. 6 a plan view of the seat for the above valve, showing the arrangement of ports; Fig. 7 a central sectional view of an automatic valve device embodying a modified form of my improvement; Fig. 8 a fragmentary sectional view of the valve portion of the above valve device, showing the parts in service application position; Fig. 9 a similar view, showing the valves in service lap position; Fig. 10 a similar view, showing the parts in emergency application position; Fig. 11 a plan view of the main slide valve seat for the above valve device; Fig. 12 a face view of the main slide valve, showing the relative location of the ports and cavities therein; Fig. 13 a face view of the graduating valve which is mounted on and has a movement relative to the main slide valve; Fig. 14 a central sectional view of still another form of automatic valve device embodying my improvement; Fig. 15 a similar view of an automatic valve device adapted to be employed in connection with an electro-pneumatic or other independent brake controlling means; Fig. 16 a diagrammatic view of a combined automatic air and electro-pneumatic brake equipment for a car with my improvement applied thereto; Fig. 17 a central sectional view of a construction similar to that shown in Figs. 1 and 2 but embodying features shown in Figs. 7 and 15, the parts being shown in normal position; Fig. 18 a similar view of the construction shown in Fig. 17, with the parts in charging position; Fig. 19 a fragmentary sectional view of the main valve and seat, showing the valve in service application position; Fig. 20 a view similar to that shown in Fig. 19 with the valve in service lap position; Fig. 21 a face view of the main slide valve, showing the relative location of the ports and cavities therein; Fig. 22 a fragmentary sectional view of the main slide valve showing the connections for graduated release; and Fig. 23 a plan view of the seat for the main slide valve of the construction shown in Figs. 17 and 18.

Referring to Figs. 1 and 2 of the drawings, the automatic valve device may comprise a casing 1 having a piston chamber 2 containing a piston 3, one side of the piston being in open communication with the train pipe 4 and the opposite side being subject to the pressure of a chamber 5. The casing 1 is also provided with a valve chamber 6 containing a slide valve 7 adapted to control the admission and release of fluid under pressure to and from the brake cylinder. The valve 7 is preferably operated by means of a stem 8 carried by the piston stem 9 of the piston 3 and is provided with a cavity 10 and a through port 11. The valve seat for the slide valve 7 has a port 12 leading to the brake cylinder, an exhaust port 13, a port 14 leading to the train pipe, a port 15 also leading to the train pipe, but provided with a check valve 16 for preventing flow of air back to the train pipe, a port 17 leading to the side of piston 3 which is open to chamber 5, and a port 18 leading to a source of fluid under pressure. In the extreme inner position of the piston 3 a feed groove 19 establishes communication from the train pipe to the chamber 5, and a yielding spring stop 20 is provided in the piston stem 9 for returning the valve parts to a position in which the feed groove 19 is closed upon substantial equalization of the fluid pressures on opposite sides of the piston 3.

The operation of the construction so far described is as follows: Air being admitted to the train pipe flows to the outer face of piston 3 and shifts the same to its inner position compressing the spring 21 of the spring stop 20, as shown in Fig. 2. Air then flows through feed groove 19, charging the chamber 5 to standard train pipe pressure. Train pipe pressure also lifts the check valve 16 and flows through port 15 to the valve chamber 6 and thence through the restricted port 11, which now communicates with port 18, charging the brake cylinder supply reservoir. The restricted communication between the valve chamber 6 and the port 18 is provided so as to insure the rapid building up of pressure in the valve chamber in order to prevent the possible lifting of the valve 7 from its seat by fluid pressure acting on the under face of the valve. When the fluid pressure in chamber 5 has become substantially equal to the train pipe pressure, the spring 21 moves the parts to normal release position as shown in Fig. 1, cutting off communication through the feed groove 19 and fully opening supply port 18 to the valve chamber 6. The fluid pressure in the valve chamber 6 and the brake cylinder supply reservoir is maintained by flow of air through port 15 past check valve 16. By providing means for maintaining the feed groove 19 closed in normal release position, any possibility of back flow from chamber 5 to the train pipe is prevented when the train pipe pressure is reduced to apply the brakes, so that the positive movement of the valve parts is assured. To apply the brakes, the train pipe pressure is reduced and the preponderating pressure in chamber 5 causes the outward movement of the piston 3 to service position as shown in Fig. 3 in which the brake cylinder port 12 is uncovered by the slide valve 7, so that fluid under pressure is admitted to the brake cylinder. In this position, port 17 leading to chamber 5 is connected to the exhaust port 13 through cavity 10 so that the pressure in said chamber is gradually reduced according to the size of the port 17. When the reduction in train pipe pressure ceases, the pressure in chamber 5 soon becomes equal to or slightly less than the reduced train pipe pressure and a graduating spring stop device 22 in piston 3 then moves the parts back to lap position, as shown in Fig. 4, closing brake cylinder port 12 and preventing further flow of air to the brake cylinder. By the same movement communication from chamber 5 to the exhaust port 13 is cut off. Further reductions in train pipe pressure may be effected as desired and the parts thereby caused to move to service application position to increase the pressure in the brake cylinder and back to lap position, as will be readily understood. Upon a sudden reduction in train pipe pressure the piston 3 makes its extreme outward traverse and port 18 is fully uncovered to supply air to the brake cylinder. In the emergency position of the parts, train pipe port 14 is connected to the exhaust port 13 through cavity 10, so as to vent air from the train pipe and cause the well known quick serial action of all the valves in the train. As in emergency position the train pipe port 14 is open to the atmosphere, when the train pipe pressure is increased to release the brakes, the flow of air from the train pipe to the atmosphere might be sufficient to prevent the movement of the parts to release the brakes. In order to prevent this, I preferably provide an additional restricted port 23 in the valve seat which opens into chamber 5 and in emergency position, the extended portion 24 of cavity 10 connects this port with the exhaust, so that the fluid pressure in chamber 5 will gradually bleed down, and finally becomes substantially equal to the reduced train pipe pressure. The spring stop 22 will then return the parts to lap position, thus closing the quick action train pipe vent port 14, and thereafter the brakes may be readily released in the usual manner by an increase in train pipe pressure. It will be noted that when the train pipe pressure is increased to release the brakes after either an emergency or service application of the brakes, the piston 3 will first move to its extreme inner position, in which the feed groove 19 is open to recharge the chamber 5, and in which the communication to supply port 18 is restricted through the port 11.

Upon cars equipped with an air compressor and main reservoir or other local source of fluid pressure, the recharging port 15 may be dispensed with, as well as the port 11, so that there is no communication between the reservoir and the train pipe, thus permitting the independent operation of the air compressor on each car, so that synchronizing apparatus for the compressors will not be necessary with this construction in order to obtain uniform pump labor.

According to the construction shown in Fig. 7 of the drawings an auxiliary or graduating slide valve 25 is mounted on and has a movement relative to the main slide valve 26. With this construction the spring stop 20 may be dispensed with and the parts are then normally maintained in the extreme inner position as shown, with the feed groove 19 normally open. Instead of controlling the train pipe charging port through the slide valve, I provide in this case a direct passage 27 having a double check valve device 28 adapted to prevent flow of air back to the train pipe and also controlling communication to the supply passage 29. I also provide means for graduating the release of the brakes comprising a supplemental reservoir 30, having a passage 31, leading to the seat of the main slide valve 26 and a charging passage 32 opening to the train pipe and containing a non-return check valve 33. In operation, when the train pipe is charged, air flows to the piston 3, and shifting the same to its extreme inner position, uncovers feed groove 19, so as to charge the chamber 5 with fluid under pressure. Air likewise flows through the passage 27 and lifting the double check valve 28 charges the valve chamber 6. The check valve 28 also seats in its upper position closing direct communication to the supply passage 29, but a restricted passage 34 is provided around the check valve 28, through which air flows to gradually charge up the brake cylinder supply reservoir. It will thus be seen that as there is a large passage open to the valve chamber 6, the pressure in said chamber practically increases at substantially the same rate as in the train pipe and thus the main slide valve is never subject to a greater pressure on its under face than that acting in the valve chamber on top of the valve and consequently there is no danger of the valve being lifted from its seat. When the brake cylinder supply reservoir becomes fully charged, the double check valve 28 drops back to its lower seat, and opens the full direct communication from the supply passage 29 to the valve chamber 6. The supplemental reservoir is charged through passage 32, as will be evident. In normal release position of the parts, cavity 35 in the graduating valve 25 connects port 36 and 37 in the main slide valve and these ports in turn register respectively with exhaust port 13 and brake cylinder port 12 so that the brake cylinder is open to the atmosphere. Port 31 is also connected by port 38 in the main slide valve 26 and cavity 39 in the graduating valve 25 with chamber 5 and serves as an additional or quick recharge means for the chamber 5, in release position. When a gradual reduction in train pipe pressure is made to effect a service application of the brakes, the piston 3 first closes the feed groove 19 and shifts the graduating valve 25 to close the port 38 and communication between the brake cylinder port 37 and exhaust port 36. The main slide valve is then moved to service application position, as shown in Fig. 8, in which service position, as shown in Fig. 8, in which service port 40 registers with brake cylinder port 12, so that air flows from the valve chamber 6 to the brake cylinder. In this position port 41 leading to chamber 5 registers with port 42 which is now connected by cavity 35 in the graduating valve 25 with port 36, and port 36 registers through a port extension 43 with exhaust port 13. Thus air is vented from chamber 5 to the atmosphere, until the pressure in said chamber falls to a degree slightly less than the reduced train pipe pressure, when the piston and graduating valve are shifted to lap position, as shown in Fig. 9, cutting off the further admission of air to the brake cylinder and the venting of air from chamber 5. The brake cylinder pressure may be increased by further reducing the train pipe pressure to cause the movement of the graduating valve to again open the service port. The brake cylinder pressure may be graded down by gradually increasing the train pipe pressure so as to shift the parts to release position in which communication being opened from the supplemental reservoir to the chamber 5 through ports 31 and 38 and cavity 39, air is vented to chamber 5, as the fluid pressure in the supplemental reservoir was maintained at normal pressure while the brakes were applied. This increased pressure in chamber 5 moves the piston 3 outwardly so as to cut off further release of air from the brake cylinder through cavity 35 in the graduating valve 25. This operation may be repeated as desired to grade down the brake cylinder pressure without entirely releasing the brakes. The brakes may be fully released by making a continued increase in train pipe pressure in the usual way. In an emergency application, the parts assume the position shown in Fig. 10, the brake cylinder port 12 being uncovered to admit fluid under pressure to the brake cylinder. The train pipe passage 27 may lead to the main slide valve seat as shown, so as to be connected to the exhaust port 13 by a cavity 45 in the main slide valve, thus providing for the venting of the train pipe to cause the quick serial action of the valve devices throughout the train. A small port 44 also connects the chamber 5 with the exhaust port 13 through cavity 45, so that the pressure in said chamber is gradually reduced to permit the movement of the parts by action of the spring stop 22 to cut off communication from the train pipe passage 27 to the atmosphere, so as not to interfere with the prompt release of the brakes. As in the construction shown in Figs. 1 and 2 where the car is equipped with its own source of fluid pressure, the charging passage 27 and the double check valve may be dispensed with and the supply passage 29 may open directly into the valve chamber 6.

The construction illustrated in Fig. 14 is quite similar to that shown in Figs. 1 and 2, except that the equalizing chamber 5 is arranged on the side of the piston opposite the valve chamber, while the train pipe connects the other side of the piston 3. As will be evident, the operation of this form is substantially the same as that of construction shown in Figs. 1 and 2 and therefore no further description thereof is necessary.

In Figs. 15 and 16 I have illustrated my improvements as applied in connection with an automatic air brake combined with an electro-pneumatic brake controlling means. According to Fig. 16, the car equipment may comprise a main reservoir 50, air compressor 51 for compressing air into the reservoir 50, a combined brake valve and brake switch 52, located at each end of the car and connected to reservoir supply pipe 53 and train pipe 54, brake cylinder 55, electric application magnet and valve 56, electric release magnet and valve 57, and automatic valve device 58. The automatic valve device comprises, as shown in Fig. 15, a casing 59, having piston chamber 60 containing piston 61 subject on one side to the pressure of a chamber 62 and the chamber 63 on the opposite side being connected to the train pipe by pipe 64. A slide valve 65 operated by stem 66 carried by piston 61 is mounted in valve chamber 67 and is provided with a cavity 68 having port openings 69 and 70. The seat for the slide valve 65 contains port 81 leading to the brake cylinder, port 71 communicating with the pipe 72, and exhaust port 73. The valve chamber 67 is connected by a pipe 75 with the main reservoir 50, so that the same is maintained under pressure when the main reservoir is charged. When the train pipe is charged with fluid under pressure, the piston 61 is shifted to its outer position and the exhaust port 73 is connected to the brake cylinder port 81 by the cavity 68. Air gradually charges the chamber 62 by way of a small port 74 through the piston 61. Upon equalization of pressure in chamber 62, a spring stop device 76 in piston 61 acts to shift the piston 61 and valve parts to the normal position shown in Fig. 15, in which the exhaust port 73 is closed and the brake cylinder port 81 is connected with port 71.

The electro-pneumatic brake controlling means may be of any desired type, but I preferably employ a construction such as shown in Fig. 16, in which the application magnet valve 56 and the release magnet valve are both connected to the pipe 72, the release magnet valve being adapted to be normally closed except when the brake switch is turned to release position. The application magnet valve 56 being connected to the main reservoir supply pipe by a pipe 77, if the brakes are to be applied by the electric means, the brake switch is turned to electric application position, so as to energize the application magnet which then operates to admit air from supply pipe 77 to pipe 72, which opens to port 71. As port 71 is now connected with brake cylinder port 81, air is admitted to the brake cylinder to apply the brakes. The brakes may be electrically released by turning the combined brake valve and switch to electric release position, so as to energize the release magnet 59 and thereby open the electric release valve to permit the exhaust of air from the brake cylinder. Upon a reduction in train pipe pressure as caused by manipulation of the brake valve or by a break-in-two of the train, the piston 61 is shifted to its extreme inner position, in which brake cylinder port 81 is opened to valve chamber 67. Air is thus admitted to the brake cylinder from the valve chamber 67 and the main reservoir. If desired, a cavity 78 may be provided in the slide valve 65, which is adapted in application position of the parts to connect exhaust port 73 with chamber 63, so that air is vented from the train pipe to cause quick serial action throughout the train in the usual well known way. In the application position the piston stem 79 of piston 61 is adapted to compress a spring stop device 80, and as soon as the fluid pressure in chamber 62 equalizes with the reduced train pipe pressure by flow through the restricted port 74, said spring device shifts the piston and valve 65 so as to close communication between the exhaust port 73 and chamber 63. This movement may be employed to either entirely or partially close the brake cylinder port 81, but if said port is left partly open then any leakage of fluid from the brake cylinder will be supplied from the main reservoir and the brake cylinder pressure will thus be maintained. Upon increasing the train pipe pressure to release the brakes, the piston 61 is shifted to its extreme outer position compressing the spring stop 76. In this position, the port opening 70 registers with exhaust port 73, so that the brake cylinder port 81 is now connected to the exhaust port 73. By this means the brakes may be released entirely by the pneumatic means, so that in case the electro-pneumatic apparatus is out of order the brakes may be readily controlled without difficulty. When the pressure in chamber 62 has equalized with the train pipe pressure by flow through the restricted port 74, the spring device 76 will shift the parts to normal position, in which the electric application and release pipe is connected to the brake cylinder port 81.

The apparatus shown in Figs. 15 and 16 is adapted more particularly for cars equipped with air compressors, and as there is no communication between the train pipe and the valve chamber 67, each air compressor operates to maintain the pressure in its own main reservoir regardless of the others, so that synchronizing apparatus for the pumps may be dispensed with. If the apparatus is to be applied to cars not provided with air compressors then means should be provided for charging the brake cylinder supply reservoir and valve chamber 67 from the train pipe, such as the means employed in connection with the construction hereinbefore described.

It will now be apparent that with my improvements, the usual auxiliary reservoir may be dispensed with on cars equipped with a source of fluid pressure, and the need for synchronizing apparatus is obviated.

In Figs. 17 to 23 inclusive is illustrated a construction very similar to that shown in Figs. 1 and 2 but with the added features of graduated release as shown in Fig. 7 and electro-pneumatic control, as shown in Fig. 15. Graduated release is provided in this construction by the same instrumentalities as employed in Fig. 7, namely, a reservoir 30, charged from the train pipe through passage 32 past check valve 33, and a passage 31 leading to the seat of the main slide valve 7 and adapted in the position shown in Fig. 17 to be connected by cavity 69ª with port 85 communicating with chamber 5. The operation of securing graduated release will be apparent in view of the description thereof in connection with Fig. 7. Electro-pneumatic control is secured in the same manner as in the Fig. 15 construction, by providing a port 71 communicating with the electric application and release magnets and connected, in the position shown in Fig. 17, through cavity 10, with brake cylinder port 12. A bridge being provided in cavity 10 for blocking the exhaust port 13 in this position, it will be evident that the brakes may now be controlled electro-pneumatically in the same manner as the construction shown in Fig. 15.

Having now described my invention, what I claim as new and desire to secure by Letters Patent, is:—

1. In a fluid pressure brake, the combination with a train pipe, brake cylinder, and a source of fluid under pressure, of an automatic valve device comprising a piston subject to the opposing pressures of the train pipe and a chamber and a valve contained in a valve chamber and operated by said piston for controlling the admission of fluid from said source of pressure to the brake cylinder and for closing communication from the valve chamber to one side of said piston.

2. In a fluid pressure brake, the combination with a train pipe, brake cylinder, and a source of fluid under pressure, of an automatic valve device comprising a piston subject only to the opposing pressures of the train pipe and a chamber and a valve contained in a valve chamber and operatively connected to said piston and operating upon a reduction in train pipe pressure to supply fluid from said source of pressure to the brake cylinder, said valve being adapted to prevent leakage of fluid from the valve chamber to one side of said piston.

3. In a fluid pressure brake, the combination with a train pipe, brake cylinder, and a source of fluid under pressure, of an automatic valve device subject to the opposing pressures of the train pipe and a chamber and having means operating upon a reduction in train pipe pressure for opening communication from said source of pressure to the brake cylinder and upon a reduction in pressure in said chamber below the train pipe pressure for closing said communication.

4. In a fluid pressure brake, the combination with a train pipe, brake cylinder, and a source of fluid under pressure, of an automatic valve device subject to the opposing pressures of the train pipe and a chamber and operated by the pressure in said chamber upon a reduction in train pipe pressure for opening communication from said source of pressure to the brake cylinder and operated by the train pipe pressure upon venting air from said chamber to close said communication.

5. In a fluid pressure brake, the combination with a train pipe, brake cylinder, and reservoir, of an automatic valve device subject to the opposing pressures of the train pipe and a chamber normally charged with fluid under pressure and operated by a reduction in train pipe pressure for effecting a service application of the brakes, and means adapted to vent fluid from said chamber to the atmosphere in service application position.

6. In a fluid pressure brake, the combination with a train pipe, brake cylinder, and reservoir, of valve means for controlling communication from said reservoir to the brake cylinder and a piston subject to the opposing pressures of the train pipe and a chamber normally at train pipe pressure for operating said valve means to open said communication upon a reduction in train pipe pressure and means for venting fluid from said chamber to operate said piston and valve means to close said communication.

7. In a fluid pressure brake, the combination with a train pipe, brake cylinder, and a source of fluid under pressure, of an automatic valve device comprising a piston subject to the opposing pressures of the train pipe and a chamber and operating independently of brake cylinder pressure and the pressure of said source and a valve for controlling communication from said source to the brake cylinder and from the chamber to the vent port.

8. In a fluid pressure brake, the combination with a train pipe, brake cylinder, and a source of fluid under pressure, of an automatic valve device subject to the opposing pressures of the train pipe and a chamber and operating upon a reduction in train pipe pressure, independently of the brake cylinder pressure and the pressure of said source for admitting fluid from said source to the brake cylinder and for venting fluid from said chamber.

9. In a fluid pressure brake, the combination with a train pipe, brake cylinder, and source of fluid under pressure, of an automatic valve device, governed by the opposing pressures of the train pipe and a chamber independently of the brake cylinder pressure, and operating upon a reduction in train pipe pressure to supply fluid from said source to the brake cylinder and for reducing the chamber pressure below train pipe pressure to cut off the supply of fluid to the brake cylinder.

10. In a fluid pressure brake, the combination with a train pipe, brake cylinder, and source of fluid under pressure, of an automatic valve device subject only to train pipe pressure in one direction and to the pressure of a chamber in the opposite direction for controlling communication from said source of fluid pressure to the brake cylinder and from the chamber to the atmosphere.

11. In a fluid pressure brake, the combination with a train pipe, brake cylinder, and source of fluid under pressure, of a piston subject only to train pipe pressure on one side and to the pressure of a chamber on the opposite side, valve means operated by said piston upon a reduction in train pipe pressure for opening communication from said source to the brake cylinder, and means for reducing the pressure in said chamber below the train pipe pressure for operating said piston to close said communication.

12. In a fluid pressure brake, the combination with a train pipe, brake cylinder, and source of fluid under pressure, of a movable abutment subject only to train pipe pressure on one side and to the pressure of a chamber normally at train pipe pressure on the opposite side, valve means operated by said piston upon a reduction in train pipe pressure for admitting fluid from said source to the brake cylinder, and means for reducing the pressure in said chamber to a degree less than the train pipe pressure to operate said abutment and valve means to cut off the admission of fluid to the brake cylinder.

13. In a fluid pressure brake, the combination with a train pipe, brake cylinder, a source of fluid under pressure, and a supplemental reservoir, of an automatic valve device subject to the opposing pressures of the train pipe and a chamber for controlling the admission of fluid from said source to the brake cylinder and the brake cylinder exhaust and adapted to control the supply of fluid from said supplemental reservoir to said chamber.

14. In a fluid pressure brake, the combination with a train pipe, brake cylinder, a source of fluid under pressure, and a supplemental reservoir, of a movable abutment subject to the opposing pressures of the train pipe and a chamber and valve means operated by said abutment for controlling communication from said source of pressure to the brake cylinder, and the admission of fluid from said supplemental reservoir to the chamber to govern the release of fluid from the brake cylinder.

15. In a fluid pressure brake, the combination with a train pipe, brake cylinder, a source of fluid under pressure, and a supplemental reservoir, of a movable abutment subject to the opposing pressures of the train pipe and a chamber and valve means operated by said abutment upon a reduction in train pipe pressure for admitting fluid from said source of pressure to the brake cylinder and upon an increase in train pipe pressure for opening communication from the brake cylinder to the exhaust and for supplying air from said supplemental reservoir to the chamber to close said exhaust communication.

16. In a fluid pressure brake, the combination with a train pipe, brake cylinder, and a reservoir adapted to be charged from the train pipe and from which air is supplied to the brake cylinder, of an automatic valve device comprising a piston subject to the opposing pressures of the train pipe and a chamber, a valve chamber adapted to be charged with fluid under pressure from the train pipe, and valve means contained in said valve chamber and operated by said piston for supplying air to the brake cylinder and for controlling communication through which said reservoir is charged from the train pipe.

17. In a fluid pressure brake, the combination with a train pipe, brake cylinder, and a reservoir from which air is supplied to the brake cylinder, of an automatic valve device comprising a piston subject to the opposing pressures of the train pipe and a chamber, a valve chamber communicating with said reservoir and with the train pipe, and valve means in said valve chamber for controlling the admission of air to the brake cylinder and having a position in which communication from the valve chamber to said reservoir is restricted, to permit the more rapid charging of the valve chamber from the train pipe.

18. In a fluid pressure brake, the combination with a train pipe, brake cylinder, and a reservoir adapted to supply air admitted to the brake cylinder, of an automatic valve device comprising a piston subject to the opposing pressures of the train pipe and a chamber and having a normal position and a charging position in which communication is opened from the train pipe to said chamber, a valve chamber communicating with said reservoir and with the train pipe, and valve means operated by said piston for admitting air to the brake cylinder and adapted in the charging position of said piston to restrict communication from the valve chamber to the reservoir.

19. In a fluid pressure brake, the combination with a train pipe, brake cylinder, and source of fluid pressure, of an automatic valve device comprising a piston subject to the opposing pressures of the train pipe and a chamber, and valve means operated directly by said piston and having ports adapted thereby upon a reduction in train pipe pressure for supplying air from said source to the brake cylinder and for venting air from the train pipe.

20. In a fluid pressure brake, the combination with a train pipe, brake cylinder, and source of fluid pressure, of an automatic valve device comprising a piston subject to the opposing pressures of the train pipe and a chamber, and valve means operated by said piston and having ports adapted upon a sudden reduction in train pipe pressure for supplying air from said source of fluid pressure to the brake cylinder and for opening a train pipe vent port.

21. The combination with a train pipe, brake cylinder, a source of fluid pressure, and an automatic valve device governed by the opposing pressures of the train pipe and a chamber and operating upon a reduction in train pipe pressure for admitting fluid under pressure from said source to the brake cylinder, of an independent valve controlling means adapted to supply air from said source to the brake cylinder.

22. The combination with a train pipe, brake cylinder, a source of fluid pressure, and an automatic valve device governed by the opposing pressures of the train pipe and a chamber and operating upon a reduction in train pipe pressure for admitting fluid under pressure from said source to the brake cylinder, of an electro-pneumatic brake controlling means for also controlling the admission of fluid from said source to the brake cylinder.

23. The combination with a train pipe, brake cylinder, air pump, and a main reservoir into which said pump is adapted to compress air, of an automatic valve device operating upon a reduction in train pipe pressure for supplying air from said main reservoir to the brake cylinder and an independent means for also controlling the admission of fluid from said main reservoir to the brake cylinder.

In testimony whereof I have hereunto set my hand.

WALTER V. TURNER.

Witnesses:
J. H. EICHER,
A. M. CLEMENTS.